United States Patent [19]
Condrac

[11] Patent Number: 5,097,744
[45] Date of Patent: Mar. 24, 1992

[54] HYDRAULIC CONTROL SYSTEM
[75] Inventor: Edward J. Condrac, Cincinnati, Ohio
[73] Assignee: General Electric Company, Cincinnati, Ohio
[21] Appl. No.: 640,763
[22] Filed: Jan. 14, 1991
[51] Int. Cl.$^5$ .............................. F15B 13/16
[52] U.S. Cl. ........................ 91/361; 60/390; 364/180; 318/590
[58] Field of Search ............... 91/361, 459; 60/390, 60/392, 420, 422, 459, 484, 705, 706; 364/180, 160, 161, 162, 163, 174, 460; 318/609, 610, 590, 591, 615

[56] References Cited
U.S. PATENT DOCUMENTS

| | | | |
|---|---|---|---|
| 3,598,975 | 8/1971 | Miller et al. | 364/160 X |
| 4,139,887 | 2/1979 | Levesque | 364/161 |
| 4,355,358 | 10/1982 | Clelford et al. | |
| 4,473,876 | 9/1984 | Minnich | 364/180 X |
| 4,608,822 | 9/1986 | Fondacci et al. | |
| 4,625,622 | 12/1986 | Gunda et al. | 91/459 X |
| 4,667,472 | 5/1987 | Clay et al. | |
| 4,718,012 | 1/1988 | Oshiage | 364/161 X |
| 4,773,025 | 9/1988 | Penkar et al. | 364/174 X |
| 4,884,402 | 12/1989 | Strenzke et al. | 91/459 X |
| 4,893,068 | 1/1990 | Evans, Jr. | 318/615 |
| 4,924,165 | 5/1990 | Kohno | 318/590 X |
| 4,972,321 | 11/1990 | Kahler | 364/428 |
| 4,999,557 | 3/1991 | Inoue | 364/161 X |

Primary Examiner—Edward K. Look
Assistant Examiner—Todd Mattingly
Attorney, Agent, or Firm—Jerome C. Squillaro; Bernard E. Shay

[57] ABSTRACT

A hydraulic control system is provided for regulating the slew rate of a servovalve driven actuator within design parameters despite widely varying load conditions. The servovale flow is maintained constant in accord with the integration of the difference between a set slew rate command signal and a measured slew rate feedback signal. Where a plurality of such actuators are driven from a single hydraulic pump, this regulation of servovalve flow also enables the pump supply pressure to remain constant despite widely varying load conditions on the individual actuators in the system.

1 Claim, 2 Drawing Sheets

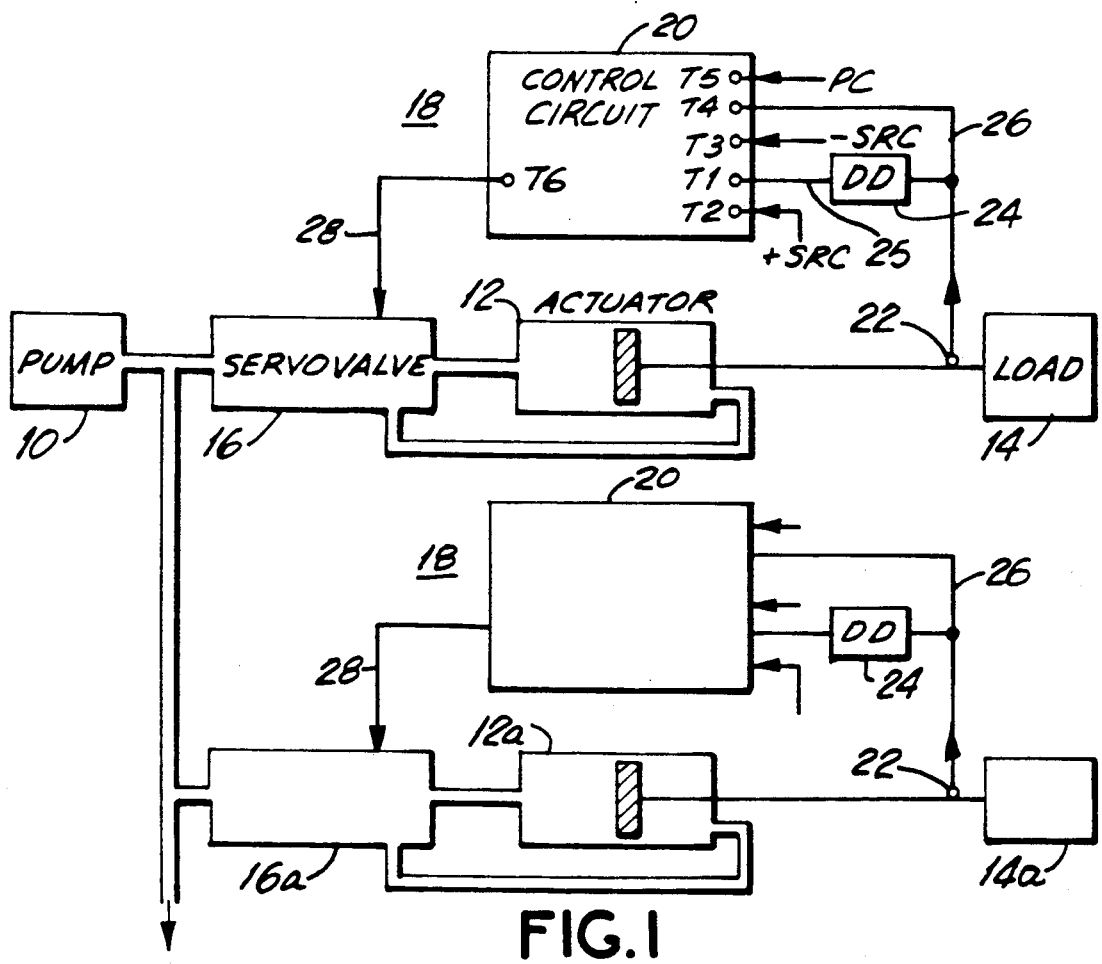
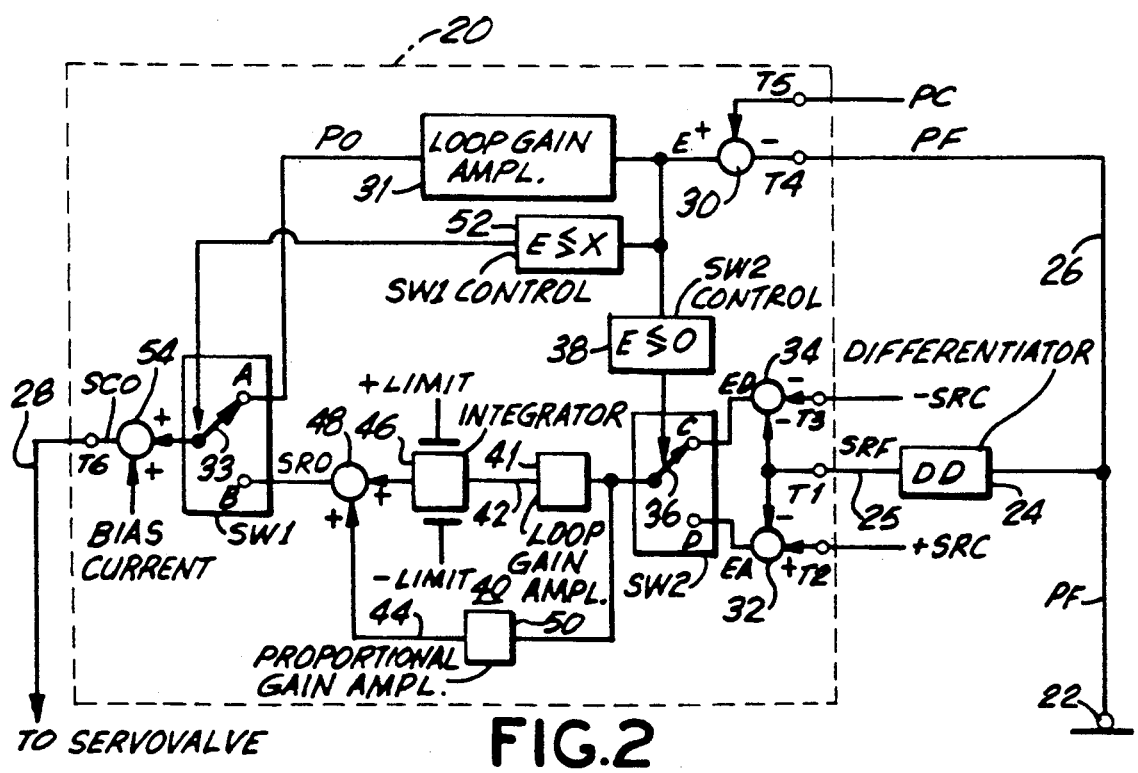

HYDRAULIC CONTROL SYSTEM

My invention relates to hydraulic control systems, and more particularly to control systems for hydraulic servovalve driven actuators.

BACKGROUND OF THE INVENTION

In hydraulic systems utilizing servovalve driven actuators, the magnitude of servovalve flow demanded by an actuator depends upon the load the actuator must move. If the load decreases below the value for which the system has been designed, the servovalve flow required to move the actuator will increase above its design value and cause the actuator to move faster than its designed slew rate. Many such occurrences ma impair the functioning of the actuator and/or the servovalve.

In addition, if several such actuators are connected to the same hydraulic pump, as is usual in, for example, jet engines, and a large percentage of these actuators simultaneously require servovalve flow greater than design, then the consequent decrease in supply pressure will cause a reduction in the capability of all the remaining actuators in the system.

SUMMARY OF THE INVENTION

Accordingly, it is an object of the invention to provide a control system for hydraulic servovalve driven actuators which regulates and maintains the magnitude of servovalve flow under widely varying actuator load conditions.

Another object of the invention is to provide such hydraulic control system which limits the magnitude of servovalve flow to values below its designed maximum flow rate.

A further object of the invention is to provide a control system for a plurality of hydraulic servovalve driven actuators connected to the same hydraulic system pump which limits the magnitude of servovalve flow required for each actuator, thereby to maintain and stabilize the pump supply pressure in the entire system even under widely varying actuator load conditions.

A still further object of the invention is to provide a servovalve limiting hydraulic control system wherein the servovalve control comprises a relatively simple logic circuit containing conventional readily available electronic components.

In accord with the invention a control system is provided for hydraulic servovalve driven actuators which maintains a setpoint actuator slew rate at a desired constant value for large actuator position demand changes even under a wide range of actuator load conditions. This constant actuator slew rate is provided by a servovalve controlling electric control circuit having means for receiving the desired actuator slew rate command signal and for comparing this slew rate command signal with a generated actuator slew rate feedback signal. The control circuit provides a slew rate controlling output signal to the servovalve which comprises an integration of the difference between these slew rate command and feedback signals and is preferably a combination of values proportional to and the integral of this difference. The slew rate feedback signal is preferably generated by providing a measured actuator feedback signal which is differentiated by a differentiator preferably of the digital type. The integral of the difference between the slew rate command and feedback signals is preferably produced by a rectangular integrator in the control circuit.

In accord with a further feature of the invention, the electric control circuit also functions to control the desired final position of the actuator and to maintain the constant actuator slew rate until just before this desired final position is reached. This is achieved by comparing a desired actuator position command signal with the measured actuator position feedback signal to produce a position controlling error signal. The output of the electric control circuit to the servovalve is switched from the slew rate controlling signal to this final position controlling signal when this error signal reaches a preset small amount.

When the invention is used in a hydraulic system containing a plurality of actuators operated from the same hydraulic pump, a separate control system embodying the invention is used for each actuator. The magnitude of servovalve flow required for each actuator is thus maintained equal to that established by the desired setpoint actuator slew rate in each control system. The total fluid flow in the entire hydraulic system is thus maintained and stabilized. This may even permit a reduction in the size of the hydraulic pump, and in some applied devices, such as in jet engines, permit a reduction in the weight and power requirements of the device itself.

The novel features of the invention are set forth in the appended claims. The invention itself, together with any further objects and advantages thereof, may best be understood by the following description taken in conjunction with the accompanying drawings in which:

FIG. 1 is a block diagram of a hydraulic system embodying the control system of the invention;

FIG. 2 is a schematic diagram of the control system of the invention including a logic diagram of its electric control circuit;

DESCRIPTION OF THE PREFERRED EMBODIMENT

Figure 3:
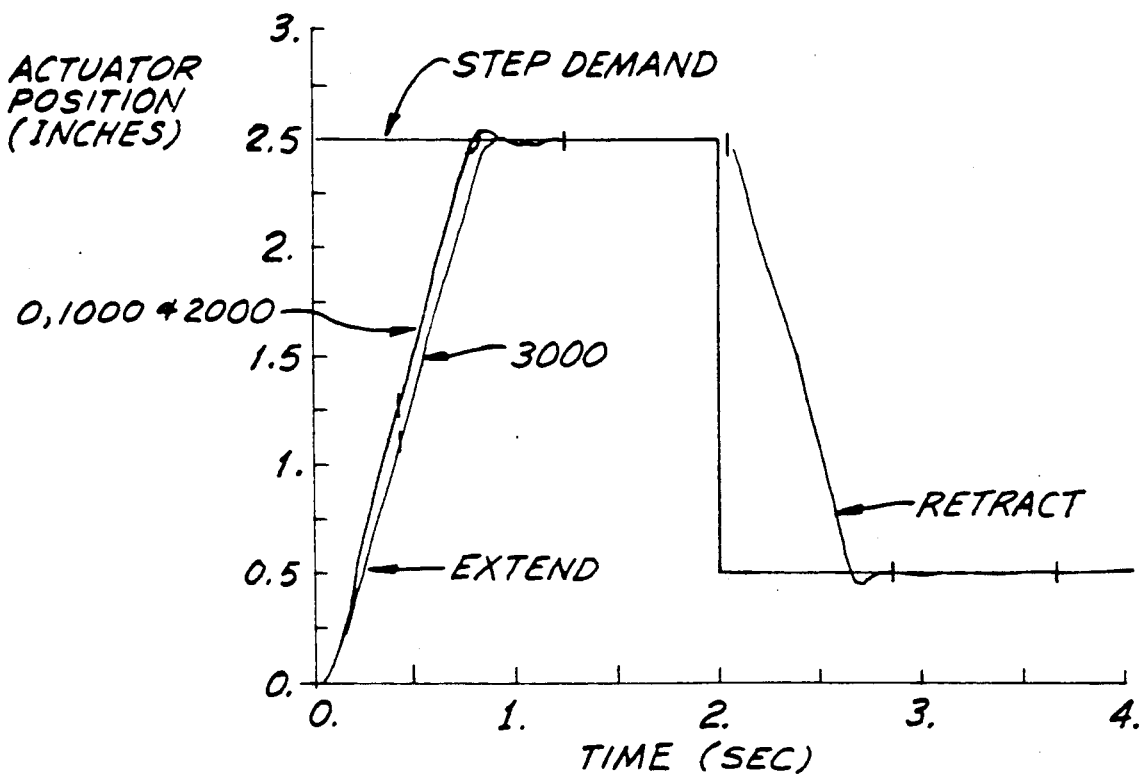
FIG. 3 is a graph of actuator position vs. time curves in one particular hydraulic control system embodying the invention under actuator loads of 0, 1000, 2000, and 3000 pound forces.

Referring to FIG. 1 there is shown a hydraulic system including a hydraulic pump 10, a pair of actuators 12, 12a which respectively drive loads 14, 14a and which are respectively operated by servovalves 16, 16a. The servovalves 16, 16a are respectively controlled by similar control systems 18 embodying the invention. Additional servovalve operated actuators may, of course, be supplied by the same pump 10 and controlled by additional control systems 18 of the invention.

Control system 18 includes an electric control circuit 20, and means for generating and supplying an actuator slew rate feedback signal SRF at its input terminal T1. This actuator slew rate feedback signal is generated by an actuator position measuring device 22 on each actuator 14, 14a which produces an actuator position feedback signal PF which, in turn is supplied to and differentiated by a digital differentiator (DD) 24 in order to produce this actuator slew rate feedback signal SRF supplied to terminal T1 through conductor 25.

Control circuit 20 also contains input terminals T2 and T3 for respectively receiving desired positive and negative actuator slew rate command signals +SRC and −SRC. Such slew rate command signals may typically be established in accord with actuator system velocity requirements.

The actuator position feedback signal PF generated by actuator position measuring device 22 is also directly supplied through conductor 26 to control circuit 20 at its input terminal T4. A further input terminal T5 of control circuit 20 is also provided for receiving a desired actuator position command signal PC.

A servovalve controlling output signal SCO of the control circuit 20 is provided at its output terminal T6, and this output signal SCO from each control circuit 20 in the hydraulic system is supplied to its respective servovalve 16, 16a through an output conductor 28.

In a typical case, the servovalve-actuator combination is sized so that, for a given design force, two-thirds of the supply pressure is taken across the actuator piston and one-third taken across the servovalve. The servovalve port area is thus sized to pass enough flow to meet a velocity requirement at the design force condition at a pressure drop of one third the supply pressure, and the design port area is determined from the design flow generally in accord with the following formula:

$$DPA = DF \div CD[(386 \cdot DP) \div (0.0361 \times SG)]^{\frac{1}{2}}$$

where
  DPA = Design Port Area
  DF = the design flow.
  DP = pressure drop across the servovalve (normally ⅓ supply pressure).
  CD = discharge coefficient of a sharp-edge orifice (normally 0.6).
  SG = specific gravity of the hydraulic fluid.
  386 = inches per second squared, constant G for acceleration of gravity.
  0.361- lbs. force per cubic inch, weight density of water @60° F.

If a rectangular port is used, the servovalve port area varies linearly with the servovalve torquemotor input current, and the design port area determines the maximum current change.

In accord with the invention, the servovalve flow is regulated to a constant value of the output signal SCO from the electric control circuit 20 as determined from the slew rate command signal SCR. If this slew rate command signal SCR is set equal to the design velocity at the design force conditions, as described above, the output current signal SCO from the control circuit 20 will be in accord with the following formula:

$$I = [(MDI \times DF) \div (CD \times SQ \times DPA)] + NB$$

where
  I = SCO from control circuit 20
  NB = The biasing current of the control circuit
  MDI = Max Delta I = the current change from null bias which yields the design port area.
  DF = Design Flow
  DPA = Design Port Area
  SQ = [(386 × DP) ÷ (0.0361 × SG)]^½

Since the servovalve pressure drop DP varies inversely with the actuator piston load force, a wide range of load force levels will result in a correspondingly wide range of output currents from the electric control circuit 20 to maintain a design servovalve flow which, in turn, maintains a design actuator velocity in accord with the preset slew command signal SCR.

In addition, as explained previously, in accord with the invention, the control circuit 20 associated with each actuator functions to provide a servovalve controlling output signal SCO at its output terminal T6 which controls the movement of each actuator from its initial position to its new commanded position at a desired slew rate that is within the design parameters of each actuator. The consequent limitation in the fluid flow of each servovalve also limits total fluid flow within the design parameters of the entire hydraulic system. More specifically, within the entire system the derivative of the pump supply pressure is equal to the bulk modulus of the fluid divided by the volume of the system, all multiplied by the pump flow minus the summation of all the individual servovalve flows. Thus, when the summation of these servovalve flows equals the pump flow, the pump supply pressure derivative becomes equal to zero, and the pump supply pressure remains constant.

Referring now to FIG. 2, the construction and operation of the electric control circuit 20 will be described.

The desired actuator position command signal PC, measured in inches, is applied to input terminal T5, and the desired acceleration and deceleration actuator slew rate command signals +SRC and −SRC, measured in inches per second, are respectively applied to input terminals T2 and T3. This position command signal PC is compared against a negative value of position feedback signal PF in the summation elements of adder 30, and the resultant difference error signal is amplified by amplifier 31 with sufficient gain to provide an actuator position controlling output signal current PO capable of operating the servo loop. This output signal is supplied to one pole A of a double pole output switch SW1.

The acceleration and deceleration slew rate command signals +SRC and −SRC are compared against the negative value of slew rate feedback signal SRF by adders 32 and 34, and the resultant acceleration and deceleration slew rate error signals EA and ED supplied to respective poles C and D of a direction selecting switch SW2. The movement of the output switch arm 36 of this latter switch SW2 between these two poles is determined by the polarity of the position error signal E which is supplied to the switch energizing component 38. This switch energizing component 38 functions to cause switch arm 36 to connect to the deceleration error signal containing pole C, as shown, whenever the position error signal E is less than zero and to connect to the acceleration error signal containing pole D whenever the position error is greater than zero.

These slew rate acceleration or deceleration error signals are then supplied to a proportional plus integral controller 40 comprising an integration path 42 and a proportional gain path 44. The integration path comprises a loop gain amplifier 45, preferably equal in gain to loop gain amplifier 31, and a rectangular integrator (RI) 46 which is capable of integrating both the acceleration and deceleration error signals. The resultant integrated signal is supplied as one input of another adder 48. The proportional gain path 44 contains a proportional gain amplifier 50 also connected to receive the slew rate acceleration or deceleration signals and to supply its output as the other input of adder 48. The output SRO of adder 48 comprising the summation of the integration and proportional amplification of the slew rate error signals is supplied to pole B of the output switch SW1 of control circuit 20. It will thus be seen that the control circuit 20 contains two functional branches, namely, a first branch which supplies an actuator position controlling error signal PO to pole A of the output switch SW1, and a second branch which supplies an actuator slew rate controlling error signal SRO to pole B of output switch SW1. The switch arm 33 of output switch SW1 is connected to one input of an output adder 5 whose other input is connected to receive a servovalve biasing current. The output of adder 54 is connected to the output terminal T6 of the control circuit 20.

The movement of the switch arm 33 of output switch SW1 between its poles A and B is controlled by switch controller 52 which receives the position error signal E and sends a switch energizing signal to the output switch SW1 whenever the value of error signal exceeds a prescribed small threshold amount X, for example, the equivalent of 0.2 inches. Thus, whenever the value of this position controlling error signal PO is greater than X, the switch arm 33 will contact pole B of switch SW1 and supply the output SRO of the proportional plus integral slew rate controller 40 to its associated servovalve through the servovalve biasing output adder 54. This causes the actuator to move toward its commanded position at a slew rate corresponding to the desired slew rate command signal SRC. However, as the actuator approaches its final commanded position, the position error signal becomes less than the threshold value X, and the switch arm 33 is moved by switch controller 52 to contact pole A of switch SW1 and deliver the final position controlling signal PO to the servovalve through the output adder 54.

It will be appreciated that the combined proportional amplification and integration of the generated slew rate error signal provided by this control circuit 20 functions to limit the rate of increase or decrease in actuator position for large changes in position command to the specified slew rate command despite a wide range of actuator load conditions.

Figure 4:
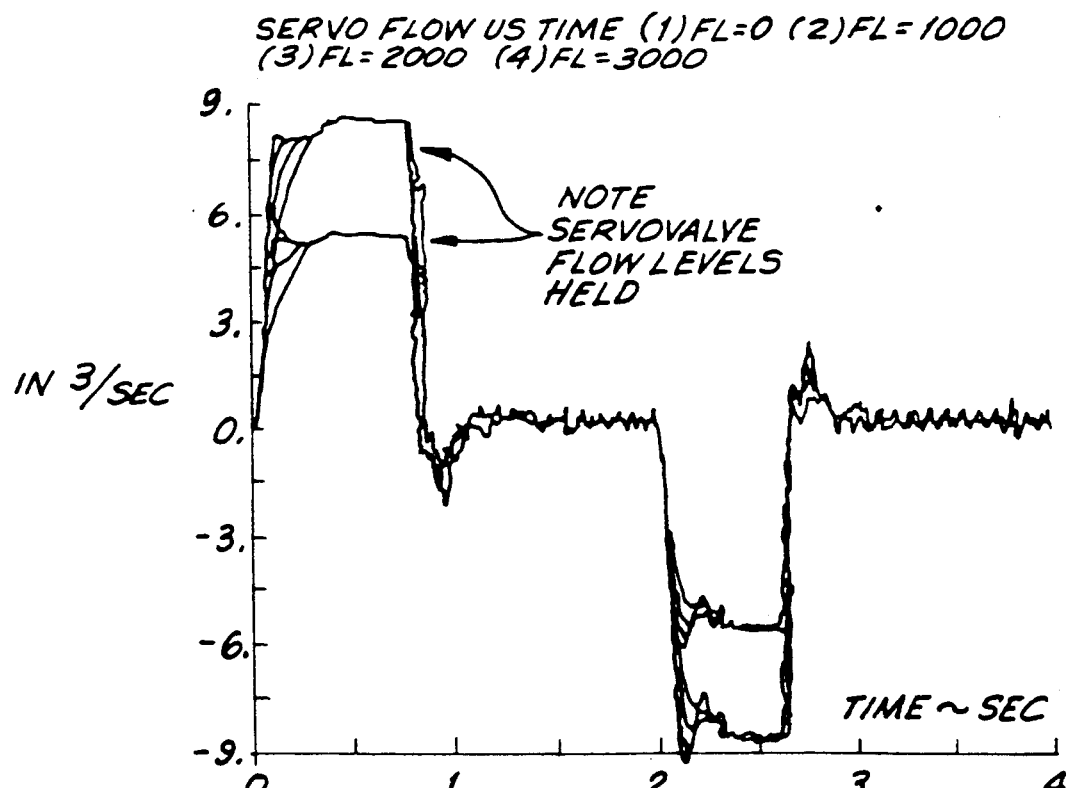
FIG. 4 is a graph of the servovalve flow vs. time curves corresponding to the actuator position curves of FIG. 3.

This is illustrated by the graphs of FIGS. 3 and 4. In FIG. 3 actuator position vs. time curves are shown for four load conditions, i.e., 0, 1000, 2000, and 3000 pound forces; while in FIG. 4, corresponding servovalve flow vs. time curves are shown. In generating these curves a single servovalve connected to a single piston chamber, as shown for one actuator in FIG. 1, was used for all load cases. The piston slides freely in the chamber as a result of fluid entering the piston head side of the chamber and leaving the rod side by way of the servovalve for actuator extension and vice versa for actuator retraction. An actuator position command signal PC corresponding to 2.5 inches was used and slew rate setpoint command signals +SRC and −SRC corresponding to approximately plus and minus 3 inches per second. The commanded actuator position PC was maintained for two seconds and then reduced to 0.5 inches.

As shown by the curves of FIG. 3, the desired setpoint actuator slew rate during extension was maintained and substantially identical for loads of 0, 1000 and 2000 pounds and only slightly less for a load of 3000 pounds, while the retraction slew rate was maintained and substantially identical for all four loads. As shown by the curves of FIG. 4, servovalve flow levels of +9 and +5.5 cubic inches per second were reached and maintained for piston head and rod side flows respectively during extension, and likewise of −9 and −5.5 cubic inches per second during retraction for all four load conditions. The flow levels, of course returned to zero after the extended and retracted steady state conditions were reached.

It should be understood that the actuator slew rates and servovalve flow rates shown in FIGS. 3 and 4 are for one particular hydraulic system embodying the invention and that the actual values to be used in or achieved by control circuit 20 will depend upon the size, weight and complexity of the hydraulic system and its components to which the invention is applied. In achieving the curves shown in FIGS. 3 and 4, limiting currents of plus and minus 10.667 milliamperes were used for rectangular integrator 46 were used together with a servovalve biasing current of 16.667 milliamperes, and the servovalve used was designed to easily respond to current levels between 6 milliamperes and 27.333 milliamperes.

It will thus be seen that the invention provides several advantages and meets all the objectives previously set forth. By establishing an appropriate actuator setpoint slew rate the actuator acceleration and the servovalve flow may be regulated and limited to values well within actuator, servovalve and pump design specifications. The fluctuations in servovalve flow can be virtually eliminated even under widely varying actuator load conditions. In those applications, such as in jet engines, where a plurality of actuators are operated from the same hydraulic pump, the resultant regulation of servovalve flow stabilizes and limits the hydraulic pressure in the system and may permit reduction in pump sizing with consequent reduction in weight and power requirements in the engine itself. Moreover, the servovalve controlling electric control circuit of the invention has a relatively simple logic system and utilizes conventional readily available electronic components.

While a particular embodiment of the invention has been described herein, many modifications may be made. It is intended by the appended claims to cover all such modifications falling within the general scope of these claims.

I claim:

1. A circuit adapted to control the position of a servovalve driven actuator wherein said actuator includes a position measuring device and said circuit receives an actuator position command signal and a plurality of slew rate command signals, said circuit comprising:
   a differentiator adapted to receive a position feedback signal from said position measuring device;
   an adder adapted to compare said position feedback signal with actuator position command signal and generate a position error signal;
   a first path, including a proportional/integral control, adapted to receive a slew rate feedback signal from said differentiator;
   a second path, including a proportional gain constant, adapted to receive said error signal;
   switch means adapted to select between said first and said second paths according to the magnitude of said position error signal;
   said plurality of slew rate command signals include a positive slew rate command signal and a negative slew rate command signal;
   said first path includes a first adder adapted to compare said slew rate feedback signal to said positive slew rate command signal and, generate a first slew rate error signal;

said first path includes a second adder adapted to compare said slew rate feedback signal to said negative slew rate command signal and generate a second slew rate error signal; and said first path includes switch means adapted to switch between said first and second slew rate error signals according to the sign of said position error signal.

* * * * *